March 8, 1960　　　　J. M. SLOUGH　　　　2,927,982
VIBRATION RESPONSIVE SWITCH
Filed June 11, 1957
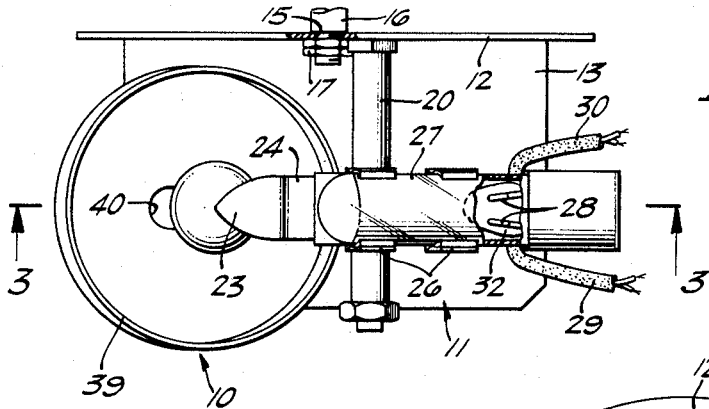
FIG. 2.
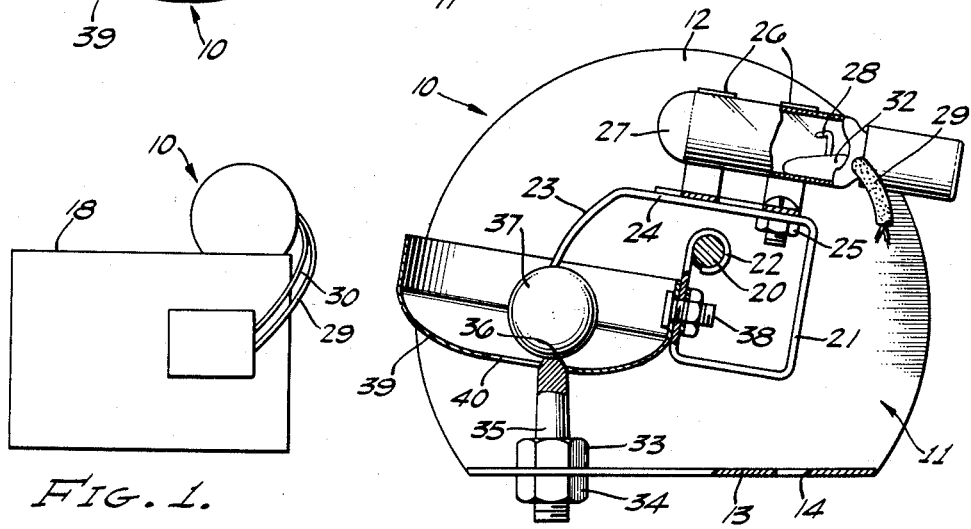
FIG. 1.
FIG. 3.
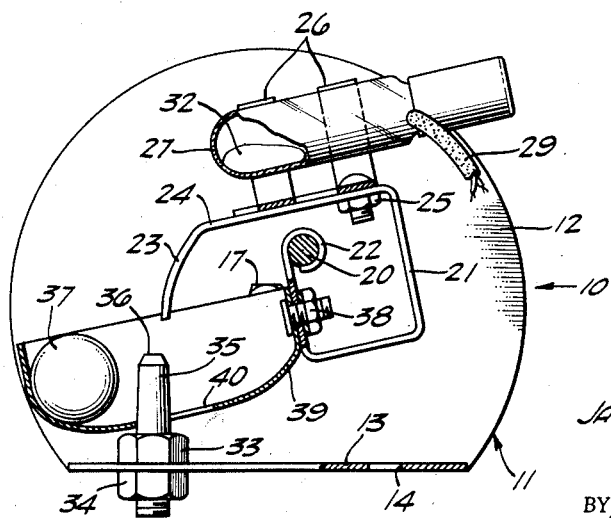
FIG. 4.
JACK M. SLOUGH
INVENTOR.
BY
ATTORNEY

United States Patent Office 2,927,982
Patented Mar. 8, 1960

2,927,982
VIBRATION RESPONSIVE SWITCH

Jack M. Slough, West Covina, Calif., assignor, by mesne assignments, to George Windeler Co., Ltd., San Francisco, Calif., a corporation of California Application June 11, 1957, Serial No. 664,970

8 Claims. (Cl. 200—61.47)

This invention relates to switches and more particularly to an electric switch movable in response to vibrations or shocks of a predetermined magnitude to reverse its position thereby changing the electric circuit in which it is connected.

There has been a growing demand for a reliable electric switch effective to sense and measure vibrations and other abnormal operating conditions to the end that a circuit controlled thereby may be modified or cut off the operation of instrumentalities responsible for the abnormal or unsafe vibration conditions. Such abnormal conditions may arise from a great variety of causes as, for example, the breakage or disruption of some part of a mechanism and unbalancing parts rotating at high speed. In other circumstances mechanism may become overloaded to the extent that shock and vibration conditions reach a dangerous level threatening the safety of near-by workmen or the apparatus itself. As a further example, water cooling towers built to a height of many feet commonly have large air circulating fans mounted at their upper ends. Ambient weather conditions or the operation of the tower itself may generate forces of dangerous proportions causing swaying and vibration of the tower components. Since these towers customarily operate for long periods un-attended, the dangerous condition may go un-noticed with disastrous results.

The switch of the present invention is designed to specifically obviate the disadvantages and shortcomings of prior safety devices, being operable to disrupt either a pilot or main control circuit containing the main power drive whenever operating conditions due to vibration, shock and the like reach dangerous levels. The switch is specifically designed to sense and respond to such conditions and to act in a manner shutting off the main power supply rendering the same ineffective until attendant has manually reset the vibration responsive switch mechanism, an operation requiring the presence of an operator who can observe the results of resumed operations.

Accordingly, it is a primary object of the present invention to provide an improved electric switch so designed as to respond automatically to abnormal operating conditions.

Another object of the invention is the provision of an electric switch required to be manually pre-set before a circuit controlled thereby can be returned to service and operative to open this circuit immediately upon the occurrence of abnormal shock or vibration conditions.

Another object of the invention is the provision of a safety switch making use of a member highly sensitive to vibration and shocks as a means for holding the switch in one of its two positions and effective to automatically transfer the switch to the other of its operating positions in response to vibration or shock conditions of a predetermined magnitude. These and other more specific objects will appear upon reading the following specification and claims and upon considering in connection therewith the attached drawing to which they relate.

Referring now to the drawing in which a preferred embodiment of the invention is illustrated:

Figure 1 is a diagrammatic view showing the switch of the present invention applied to a machine the operation of which it is desired to discontinue automatically upon the occurrence of abnormal operating conditions;

Figure 2 is a top plan view of the switch shown in set position;

Figure 3 is a cross-sectional view on the line 3—3 of Figure 2; and

Figure 4 is a view similar to Figure 3 but showing the position of parts after abnormal operating conditions have dislodged the switch prop causing the switch to move to its second operating position.

Referring to the drawing there is shown a switch generally designated 10 designed to respond automatically to abnormal operating conditions involving excess vibration and shock. The main frame 11 of the switch is formed of sheet metal bent to provide an upright back wall 12 and a horizontally disposed shelf 13. As here shown, both shelf 13 and the back wall 12 are provided with openings 14 and 15 respectively, by means of either of which frame 11 can be mounted rigidly on a piece of equipment sought to be protected. As is best shown in Figure 2, back plate 12 may be rigidly clamped to the threaded end of a stud 16 extending through the opening 15 and secured in place by lock nuts 17. The supporting rod 16 may be a rigid part of a water tower or in fact any piece of equipment. By way of example, the piece of equipment 18 in Figure 1 may represent a centrifugal extractor carefully balanced and designed to operate normally without substantial vibration. Under abnormal conditions, however, the extractor may vibrate dangerously, a condition sensed immediately by switch 10, and effective to cut off the power supply to the extractor in a manner explained in detail below.

Projecting from the face of back wall 12 is a stud 20 pivotally supporting a metal strip 21 having the shape of a figure 9. Curled end 22 of this strip has a loose fit on stud 20 as to pivot freely, and its opposite pointed end 23 extends downwardly, as is best indicated in Figures 2 and 3. Clamped to the upper side of straight portion 24, as by nut and bolt 25, is a pair of U-shaped spring clips 26 frictionally seating therebetween tubular body 27 of a conventional mercury switch. Projecting longitudinally into one end of tube 27 in spaced relation to one another are a pair of terminals 28 connected respectively on their exterior to lead wires 29 and 30. These terminals are adapted to be submerged in a body of mercury 32 sealed within the tube whenever the latter is inclined to the position illustrated in Figure 3. However, upon the reverse inclination of the tube, the mercury flows to the opposite end of the tube opening the circuit between terminals 28, 28.

Rigidly secured to shelf 13, as by lock nuts 33, 34, is a pedestal 35 having a small area upper end provided with a concavity 36 for seating a ball 37 when the latter is accurately centered in the concavity. It is pointed out that the axis of pedestal 35 lies approximately beneath the pointed end 23 of strip 21 when the latter is tilted to the position shown in Figure 3 sufficiently to be propped in this position by ball 37. In this latter position, switch tube 27 is tilted to its closed position with the mercury charge 32 bridging or submerging contacts 28, 28.

Rigidly secured to strip 21 by a bolt or the like 38 is a cup-like receptacle 39 having an elongated slot 40 through which pedestal 35 extends with ample clearance therefrom and permitting the receptacle to pivot through a limited arc about supporting stud 20.

The mode of operation of the described vibration responsive switch discussed above will be readily apparent from the description of its components. Let it be assumed that the switch is connected in a circuit controlling the power supply to a centrifugal extractor 18 and that safety cut-off switch 10 is rigidly connected to the extractor by way of stud 15. In this instance, it will be understood that the circuit wires 29 and 30 controlled by mercury switch 27 are preferably in circuit with a relay controlling the main power supply for extractor 18. In other applications, utilizing a small driving motor, lead wires 29 and 30 may be connected directly in circuit with the main switch, it being understood that whether the safety switch of this invention is directly or indirectly connected to the control circuit is a matter of choice depending primarily upon the size of the prime mover for the unit being controlled.

Normally safety switch 27 is counterbalanced to the position illustrated in Figure 4 and the circuit between terminals 28 is open. Under these conditions, it will be impossible to operate the extractor until the safety switch has been set in its operative position. To so set switch 10, the operator first tilts switch 27 clockwise about stud 20 until mercury charge 32 bridges terminals 28. In order to hold the switch in this position the prop provided by ball 37 must be seated in concavity 36 at the top of pedestal 35 with pointed end 23 of strip 22 resting against the ball. Such seating of the ball 37 is facilitated by the receptacle 39 which serves to guide said ball into seat 36 with the clockwise tilting of switch 27. In this position of the components, the switch is positively locked in its closed position where it will remain until such time as vibration or shock conditions of a predetermined magnitude occur, these being effective to dislodge ball 37 from its seat on pedestal 35. The switch is instantly free to pivot counterclockwise, this movement being greatly accelerated and positively carried out by the counterclockwise forces acting on the switch as augmented by the weight of ball 37 in receptacle 39. As tube 27 pivots counterclockwise past the horizontal, mercury charge 32 shifts to the left opening the circuit theretofore provided between terminals 28, thereby opening the circuit to the main power circuit controlling the drive for extractor 18.

Although the safety device described hereinabove is effective to open an electric circuit upon the occurrence of abnormal operating conditions, it will be understood that terminals 28 may be located at the opposite end of the switch tube in position to be bridged by the mercury charge upon the occurrence of abnormal conditions. In this event the bridging of terminals by the counterclockwise pivoting of the switch can be utilized to actuate a relay or a hydraulic valve or any other suitable control means the operation of which is required to discontinue the generation of abnormal stresses. It will likewise be understood that the sensitivity of the switch to abnormal conditions can be varied over a considerable range by shifting mercury switch 27 transversely of the supporting shaft 20. In this connection the shifting of the switch in the supporting strip 26 relative to the supporting strip 21 adjusts the weight tending to pivot the switch counterclockwise. This adjustment will obviously vary the forces holding prop 37 seated on pedestal 35, the strength of these forces being understood to be a measure of the vibration forces required to displace the prop.

While the particular vibration responsive switch herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. An electric switch comprising a pair of contacts sealed within a tube and adapted to be bridged by a body of mercury when the tube tilts to one inclination, and to be opened when said tube tilts to a reverse inclination, means movably supporting said tube, means biasing said tube to a particular one of said inclinations, vibration-responsive means comprising a rolling element and a support therefor providing a relatively narrow base adapted to seat said rolling element such that it is substantially equally sensitive to vibrations about a vertical axis therethrough, said vibration-responsive means serving to hold said tube in the second of said inclinations so long as vibration conditions transversely of said axis are below a predetermined value and being movable out of holding position automatically as vibration conditions to which it is responsive exceed said value, and means for holding said rolling element captive after displacement from said support and for redirecting said rolling element onto said narrow base for seating in said holding position as the tube is pivoted into said second of said inclinations.

2. A vibration responsive switch comprising a frame pivotally supporting a mercury switch for movement between open and closed positions, prop means of limited stability adapted to be interposed between said frame and said mercury switch to hold the latter in a first position and comprising a freely movable element and a support therefor having a relatively narrow base adapted to seat said element such that it is sensitive to vibrations directed transversely of a vertical axis through said element, said mercury switch being automatically movable to a second one of said positions upon the displacement of said element, and means for holding said element captive and utilizing the weight thereof to move said mercury switch into said second one of said positions upon displacement of said element from said support.

3. An automatic electric switch responsive to shock and vibration conditions to move to open position, said switch comprising a frame pivotally supporting a mercury switch for movement between open and closed positions, and including a downwardly directed element rigid therewith and having a pointed end, a small area pedestal positioned beneath said pointed end when said switch is pivoted to closed position, and a ball prop element adapted to be seated on said pedestal to support the pointed end of said element and effective to hold said switch in closed position until dislodged from said pedestal by shock or vibration conditions, and means carried by said switch positioned to catch said ball when dislodged and utilizing the weight thereof to hold said switch open.

4. An automatic switch as defined in claim 3 characterized in that said ball catching means includes an open-topped receptacle adapted to catch the displaced ball and to be counterbalanced thereby to the open position of the switch.

5. An automatic switch as defined in claim 3 wherein said ball upon being dislodged from said pedestal is effective to counterbalance said switch to its open position.

6. An automatic vibration responsive switch comprising a pivotally supported mercury switch movable between open and closed positions, means for adjustably supporting said switch crosswise of the pivot support therefor to vary the strength of the forces tending to pivot the same in a particular direction about said pivot, prop means of limited stability for holding said switch propped in a given one of said switch positions in opposition to said pivoting forces, said prop means including a rolling element supported upon a seat from which it is displaceable responsive to forces acting transversely of a vertical axis through said element thereby to permit automatic movement of the switch to the other of said positions, and means for holding said element captive after displacement from said seat and utilizing the weight thereof to move the mercury switch into the other of said positions.

7. An electric switch comprising a pair of contacts sealed within a tube and adapted to be bridged by a body of mercury when the tube tilts to one inclination, and to be opened when said tube tilts to a reverse inclination, means movably supporting said tube, means biasing said tube to a particular one of said inclinations, vibration-responsive means substantially equally sensitive to vibrations about a vertical axis therethrough for holding said tube in the second of said inclinations so long as vibration conditions transversely of said axis are below a predetermined value and being movable out of holding position automatically as vibration conditions to which it is responsive exceed said value, said vibration-responsive means comprising a rolling element, a support for said rolling element providing a very narrow base adapted to seat said element thereon until vibration conditions exceed said predetermined value, said rolling element being positioned to hold said tube in said second inclination while seated on said support, and means for holding said rolling element captive in a position disposed laterally to one side of a vertical plane through said tube and utilizing the weight of the element to hold the tube in the other of the positions thereof after displacement from the support for said rolling element.

8. An electric switch comprising a pair of contacts sealed within a tube and adapted to be bridged by a body of mercury when the tube tilts to one inclination, and to be opened when said tube tilts to a reverse inclination, means movably supporting said tube, means biasing said tube to a particular one of said inclinations, vibration-responsive means substantially equally sensitive to vibrations about a vertical axis therethrough for holding said tube in the second of said inclinations so long as vibration conditions transversely of said axis are below a predetermined value and being movable out of holding position automatically as vibration conditions to which it is responsive exceed said value, said vibration-responsive means comprising a ball and a pedestal having a small area end seating said ball in position to hold said tube in said second inclination, receptacle means connected with said switch tube for receiving said ball and holding the same captive after the ball is displaced from said pedestal, and means for utilizing said displaced ball to hold said switch tube in the second one of its two predetermined positions.

References Cited in the file of this patent

UNITED STATES PATENTS

| | | |
|---|---|---|
| Re. 21,194 | Blanchett | Sept. 5, 1939 |
| 2,184,497 | Hickey | Dec. 26, 1939 |
| 2,291,245 | Lorraine | July 28, 1942 |
| 2,503,449 | Murray | Apr. 11, 1950 |
| 2,754,497 | Wolpert | July 10, 1956 |

FOREIGN PATENTS

| | | |
|---|---|---|
| 721,772 | France | Mar. 8, 1932 |
| 329,149 | Italy | Sept. 2, 1935 |